United States Patent [19]
Valentino

[11] 3,783,439
[45] Jan. 1, 1974

[54] BATTERY CHARGER ADAPTER
[76] Inventor: Paul Valentino, 790 N.E. 119th St., Biscayne Park, Miami, Fla.
[22] Filed: Feb. 14, 1973
[21] Appl. No.: 332,320

[52] U.S. Cl................. 339/234, 136/181, 339/237
[51] Int. Cl............................................. H01r 11/26
[58] Field of Search .................................
339/224–241; 136/181

[56] References Cited
UNITED STATES PATENTS
3,605,065  9/1971  Shannon ........................... 339/224
3,745,516  7/1973  Liberman .......................... 339/228

Primary Examiner—Joseph H. McGlynn
Attorney—Salvatore G. Militana

[57] ABSTRACT

An adapter for connecting a battery to a battery charger wherein the battery is provided with terminals extending along its side wall with a threaded bore for receiving a connector post. The adapter is provided with a pair of metallic rings each of which fits over the post and is tightened thereon by an elongated metallic rod threaded on the ring and engaging the post. The end of each of the rods is bent to form a handle for tightening and loosening the rods against the posts. The rods are prevented from being separated by an elongated pliable member that consists of non-conducting material. The handles are each connected by conductors that extend to the battery charger.

3 Claims, 5 Drawing Figures

PATENTED JAN 1 1974 3,783,439

BATTERY CHARGER ADAPTER

BACKGROUND OF THE INVENTION

1. Field Of The Invention

This invention relates to connectors for batteries and is more particularly directed to an adapter that readily connects and disconnects a battery to a battery charger.

2. Description Of The Prior Art

In order to eliminate the corroding of battery terminals extending upwardly through the top of the battery caused by the overflow of electrolyte during the charging of the batteries, certain of the newer batteries are being manufactured with the terminals extending through the side wall of the batteries with threaded bores for receiving a connector post or plug to which cables are connected for grounding and connecting to the various parts of an automobile engine. At present, these connector posts must be unthreaded and removed from the terminals in order to connect battery charging connectors and cables. This, of course, results in increased costs in time and money in the normal function of charging a battery. It is the aim of the present invention to avoid the necessity of spending so much time and effort in order to be able to charge the battery by providing a device having an adapter that fits directly on the connector posts.

SUMMARY OF THE INVENTION

Therefore, it is a primary object of the present invention to provide a battery charger adapter that is connected directly to the connector posts mounted on terminals of a battery normally used in the operation of an engine thereby resulting in time saving by not having to remove the connector posts and replacing them by a second pair of connector posts that extend to a battery charger.

Another object of the present invention is to provide a battery charger adapted for batteries having their terminals along the side wall thereof, wherein the adapters consists of a ring or collar-like member that fits over the normal terminal connector posts and are tightened thereon by a threaded rod extending through a threaded bore in the collar-like members.

A further object of the present invention is to provide the above named threaded rod for battery charger adapters with an insulated pliable member that secures them together to prevent their loss or separation and with bent end portion forming a handle for threading and unthreading the rods in place on the collar-like members.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

DESCRIPTION OF THE PREFERRED EMBODIMENT

Figure 1:
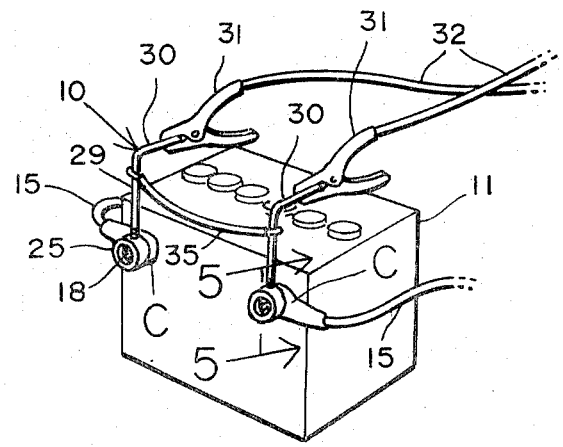
FIG. 1 is a perspective view of my battery charger adapter as seen mounted in position on the terminals of a battery with cables extending to a battery charger (not shown).
Figure 5:
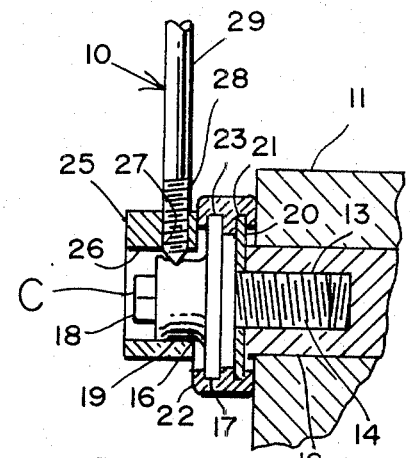
FIG. 5 is a fragmentary cross sectional view taken along the line 5—5 of FIG. 1.
Figure 2:
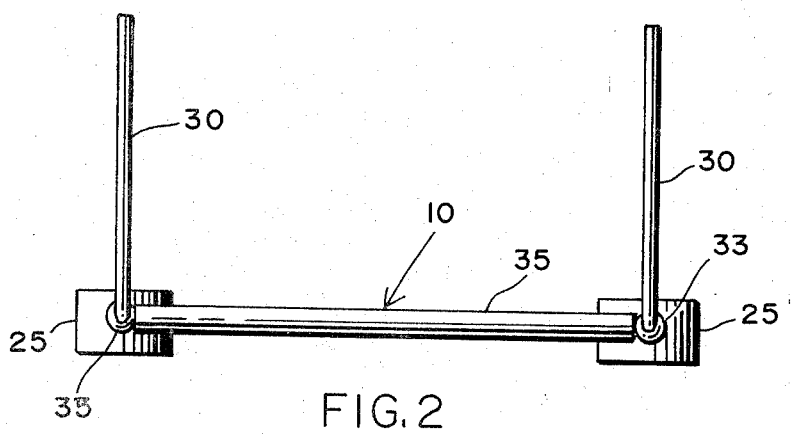
FIG. 2 is a top plan view of my adapter as seen removed from the battery.
Figure 3:
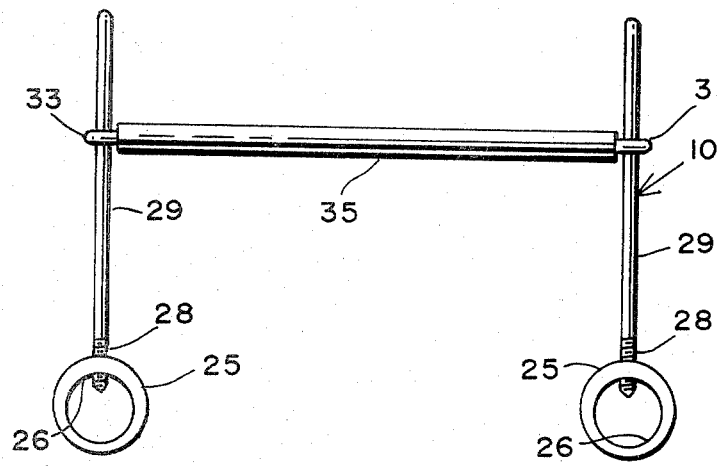
FIGS. 3 and 4 are front and side elevational views thereof.
Figure 4:
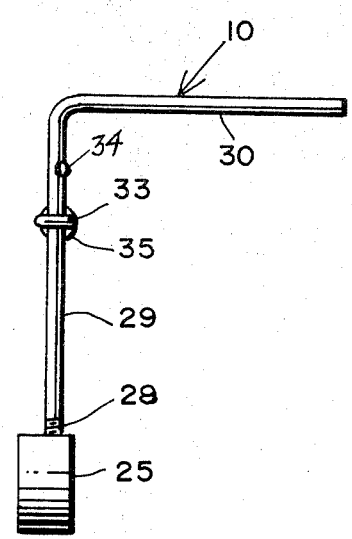

Referring to the drawing wherein like numerals are used to designate similar parts throughout the several views, the numeral 10 refers to my battery charger adapter shown connected directly to cable connectors -C- which in turn is connected to terminals 12 of a battery 11. The battery terminals 12 which extend through the side wall of the battery 11 is provided with a threaded and axially disposed bore 13 having a threaded plug or post 14 of the cable connectors -C- threadedly mounted therein.

The cable connectors -C- which are mounted on the terminals 12 are connected to cable 15 extending to the various parts of an automobile and not shown herein. Mounted integrally on the post 14 of the cable connectors -C- is a head portion 16 provided with a peripheral flange 17 and a hexagonal end portion 18. Between the flange 17 and end portion 18 is a cylindrical portion 19 on which my adapter 10 is removably mounted making contact therewith. Interposed between the battery terminal 13 and the flange 17 is a metallic washer 20 whose periphery is received by a circular slot 21 in a plastic cap 22 that enshrouds the head portion 16 of the connectors -C-. A second circular slot 23 in the plastic cap 22 receives the peripheral flange 17.

My battery charger adapters 10 that are connected to the cable connectors -C- at the position of the contact portion 19 consists of a collar-like member or metallic ring 25 having a non-concentrically positioned bore 26 to provide a thickened portion along one side of the member 25 for a threaded bore 27. The threaded end 28 of a metallic rod 29 is received in the threaded bore 27 and when tightened therein, the rod 29 engages the contact portion 19 of the connectors -C- to secure the collar 25 to the connector -C- and make electrical contact therewith. The end of the rods 29 are bent to form handles 30 for threading and unthreading the rods 29 in the threaded bores 28 and also form connectors for the clamps 31 mounted on the end of cables 32 that extend to a battery charging device (not shown). To prevent the rods 29 from becoming separated from each other or lost, the rods 29 are connected together by a non-conductor member 35 on whose ends eye-bolts 33 are secured; the eye-bolts 33 being received by the body of the rods 29. Shoulders 34 formed on the rods 29 prevent the eye-bolts 33 from slipping off the rods 29.

In the conventional manner of charging the battery 10, the connectors -C- are removed from the battery terminals 12 by placing a wrench on the hexagonal end portion 18 and unthreading the threaded post 14 out of the threaded bore 13 to be replaced by a similar threaded member connected to the charger cables 32. After the battery 11 has been properly charged, the charger equipment has to be removed and disconnected from the terminals 12 and the connectors -C- replaced thereon.

In accordance with my invention as explained hereinabove, it is to be noted that when the battery 11 is to be connected to a charger, the connectors -C-, nor any other connections needed for the operation of the automobile need be disconnected. In this instance all that need be done to charge the battery 11 is connect the mount. The collars 25 on the connectors -C-, tighten the rods 29 and clamp the alligator clamps 31 to the handles 30, thereby connecting the battery 11 to the charger. When the battery 11 is to be disconnected from the charger, the adapter 10 alone is removed from the battery restoring the battery to its use as a source of electrical energy to the motor.

What I claim as new and desire to secure by Letters Patent of the United States is:

1. An adapter for connecting a battery charger to a battery having terminals with a centrally formed bore and extending to side walls of the battery and a threaded post mounted in the bore, the combination comprising a substantially cylindrical collar received on each of said posts, said collars having a radially extending threaded bore, a rod threaded in each of said threaded bores, said rods having an end portion bent at a substantially right angle forming a handle for rotating said rods and securing said collars on said posts and a non-conducting member connecting said rods whereby said rods are maintained together when stored and when in use on a battery.

2. The structure as recited by claim 1 wherein said collars are provided with a non-concentrically positioned bore forming a thickened portion and said threaded bores being positioned in said thickened portion of said collars.

3. The structure as recited by claim 2 and an eyebolt slidably mounted on each of said rods, said eye-bolts being secured to the ends of said non-conducting member and shoulder means mounted on said rods preventing the sliding of said eyebolts off said rods.

* * * * *